Oct. 27, 1953 O. M. STUETZER 2,657,345

TRANSCONDUCTOR EMPLOYING LINE TYPE FIELD CONTROLLED SEMICONDUCTOR

Original Filed Oct. 6, 1949

INVENTOR.
OTMAR M. STUETZER
BY James S. Shannon
AGENT and
Wade Koontz
ATTORNEY

Patented Oct. 27, 1953 2,657,345

UNITED STATES PATENT OFFICE 2,657,345

TRANSCONDUCTOR EMPLOYING LINE TYPE FIELD CONTROLLED SEMICONDUCTOR

Otmar M. Stuetzer, Springfield, Ohio

Original application October 6, 1949, Serial No. 119,985, now Patent No. 2,618,690, dated November 18, 1952. Divided and this application May 20, 1952, Serial No. 288,996

4 Claims. (Cl. 317—235)

(Granted under Title 35, U. S. Code (1952), sec. 266)

The invention described herein may be manufactured and used by or for the Government for governmental purposes without payment to me any royalty thereon.

This application is a division of my application Ser. No. 119,985, filed October 6, 1949, now Patent 2,618,690 issued November 18, 1952.

This invention relates to transconductive devices of the type employing a semiconductor as the current controlling element.

In my patent application Serial No. 119,541, filed October 4, 1949, there was described and claimed a transconductive device employing a semiconductor in which the output electrode made a point contact with the semiconductor and in which the input or control electrode was positioned very close to the point contact and served to control the electrical field in the neighborhood of the point contact. Variations in control electrode potential, as by a signal voltage, produced corresponding variations in output electrode current. The device had high input impedance, high current and power amplification, and high efficiency. It had circuit impedance values comparable to those of a vacuum tube and within its power limitations could, like a vacuum tube, be used as an amplifier, detector, oscillator, volume controlling device, grid controlled rectifier, etc. The device also exhibited a peculiar characteristic in that the sign of its mutual conductance was a function of the control electrode bias voltage. This characteristic permitted its use as a phase inverter in which a reversal of phase could be produced by shifting the bias from a value at which the mutual conductance was of one sign to a value at which the mutual conductance was of the opposite sign.

The transconductive device described in the present application is similar to that described above in its characteristics and uses but is different in that a line contact, rather than a point contact, is made between the output electrode and the semiconductor, a line contact being defined as a contact area one dimension of which is very large compared to the other. This type construction is easier, particularly for quantity production of the device, and in addition results in smaller interelectrode capacities, higher mechanical and electrical stability and higher power handling capacity.

It is accordingly the object of the invention to provide a transconductive device employing a field controlled semiconductor and having many of the characteristics of a vacuum while not requiring a heated cathode or an evacuated envelope.

It is a further object of the invention to provide a transconductive device of the semiconductor type having a high input impedance, high current and power amplification and high efficiency.

It is a still further object of the invention to provide a transconductive device of the semiconductor type in which a line contact exists between the output electrode and the semiconductor and in which a control electrode is provided for controlling the electrical field in the neighborhood of the line contact.

It is another object of the invention to provide a transconductive device of the semiconductor type the design of which lends itself readily to modern manufacturing techniques such as evaporation, sputtering and electroplating.

It is still another object of the invention to provide a transconductive device of the semiconductor type which has a high degree of mechanical and electrical stability.

It is a further object of the invention to devise suitable processes for manufacturing transconductive devices of the type described.

The specific details of the invention will be explained in connection with the accompanying drawing showing an embodiment thereof, in which.

Figure 1:
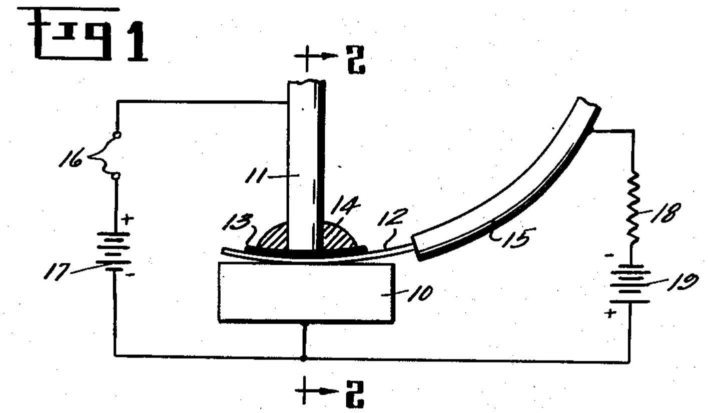
Fig. 1 is a schematic diagram of a transconductance device employing line contact between the output electrode and the semiconductor.
Figure 2:
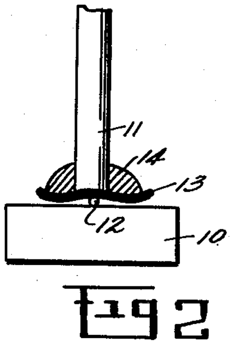
Fig. 2 is a sectional view of Fig. 1.

Referring to Figs. 1 and 2 a transconductive device in accordance with the invention is shown and comprises a semiconductor 10, a control electrode 11 and an output electrode 12. The output electrode 12 consists of a very fine wire which is pressed against the semiconductor 10 by the control electrode 11. The control electrode is insulated from the wire 12 by a sheet of insulating material 13 which should be as thin as possible. A drop of colloidal silver 14 is deposited on the insulating sheet and around the end of the control electrode to distribute the electrical potential of the control electrode over the insulating member. As semiconductor material n-type and p-type germanium, p-type silicon and tellurium are recommended. The n-type and p-type designation is in accordance with the present theory of conduction in semiconductors, the former representing conduction by free electrons and the latter representing conduction by "holes" due to absences of electrons in the interatomic bonds. The output electrode 12 is shown in Fig. 1 as the core of a piece of Wollaston wire. Wollaston wire is made up of a very fine wire relatively hard metal such as platinum as the core and an outer sheath 15 of a relatively soft metal such as silver which protects the fine core wire and adds sufficient strength and size to make the composite strand easy to handle. The core may have a diameter of from 2½ to 5 microns and is exposed by eating away the outer layer of silver with a suitable acid usually supplied by the manufacturer of the wire. While Wollaston wire is well suited for the use as the output electrode, fine wires of other metals such as tungsten may also be employed. The insulating sheet 13 may be made of any suitable thin insulating material such as thin glass, paper or plastic material such as cellophane. The control electrode should have a flat end surface of greater dimensions than the diameter of the wire forming the output electrode.

An input circuit, consisting of input terminals 16 and bias voltage source 17, is connected between the control electrode and the semiconductor. An output circuit, consisting of load impedance 18 and direct current source 19, is connected between the output electrode and the semiconductor. Variation of the potential of control electrode 11, as by the application of a signal to terminals 16, results in corresponding variations of current in the output circuit. This is believed to be due to the variation of the electric field in the semiconductor in the neighborhood of the line contact. The polarity of source 19 is normally such as to send current in the high resistance or back direction of the semiconductor. For n-type germanium operation in the back direction requires that the output electrode be negative with respect to the semiconductor as shown in Fig. 1. Operation in the forward direction is also possible and results in low noise and low relaxation effects making such operation advantageous in some high frequency applications. Forward operation is also characterized by greatly reduced power output and output impedance as compared with operation in the back direction. The input impedance of the device is extremely high and comparable to that of a vacuum tube. The device also draws no current from bias source 17 which adds to its efficiency.

Figure 3:
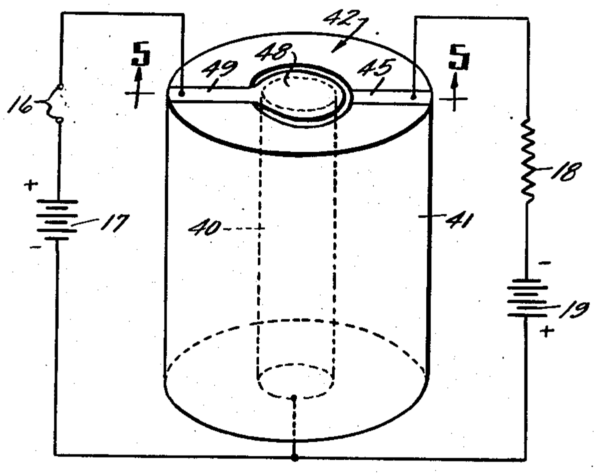
Fig. 3 shows an assembled transconductive device in accordance with the invention.
Figure 4:
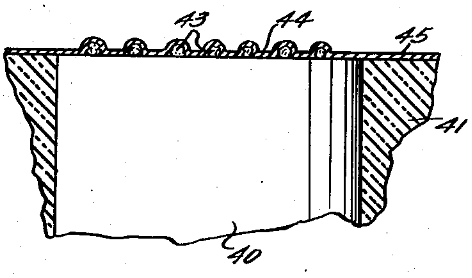
Fig. 4 shows a step in the process of making the electrode structure of Fig. 1.
Figure 5:
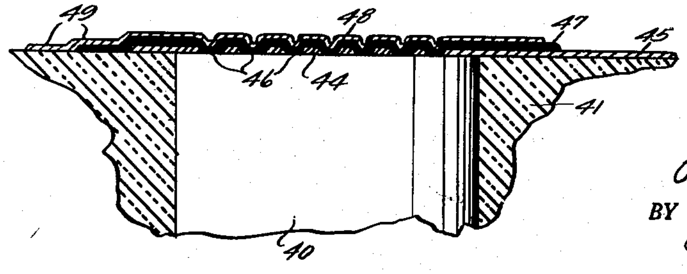
Fig. 5 is a sectional view of the completed electrode structure of Fig. 1.

Figs. 3, 4 and 5 show an arrangement for obtaining a large number of parallel acting line contacts. Referring to Fig. 3 a semiconductor 40 of cylindrical form is encased in a tube 41 of insulating material such as glass or quartz. The upper end of the semiconductor and tube assembly is a plane surface perpendicular to the axis of the assembly. An electrode structure 42, the details of which are shown in Fig. 5, is placed over the end of the semiconductor 40.

Figs. 4 and 5 illustrate the procedure for making the electrode structure 42. The dimensions being dealt with are extremely small, the diameter of the cylindrical semiconductor 40 being from ½ to 1 millimeter. For this reason it is not practical to draw Figs. 4 and 5 to scale, and these figures are intended to illustrate the manufacturing processes of the electrode structure rather than the relative sizes of the parts involved. In this case it is desired to obtain on the end of the semiconductor a large number of interconnected thin and narrow strips of metal which make substantially line contacts with the semiconductor and act as output electrodes, and to apply a controlling electrical field in the open areas between the contacting strips. This is accomplished by first dusting the end of the semiconductor 40 with a powder the individual particles of which are from 1 to 3 microns in diameter. Suitable materials for this purpose are titanium dioxide and tantalum dioxide. The dusting should be such that a single layer of particles is formed with the particles not quite touching each other. The proper density would be obtained by approximately 200 particles evenly distributed over the end of a semiconductor having a diameter of ½ millimeter. These particles are represented at 43 in Fig. 4, however, as already mentioned, this figure is not drawn to scale and in an actual embodiment the density of particles would be greater so that the spacing between particles would be less than the proportionate spacing shown. A ratio of particle spacing to particle diameter of 1 to 1 or less appears to give best results. After dusting, a layer of silver or antimony 44, preferably thinner than the radius of the particles is deposited over the dusted end of the semiconductor as shown in Fig. 4. By use of a suitable mask the area over which metal is deposited may be limited to an area only slightly larger than the end of the semiconductor. The mask may also contain a slot on one side so as to deposit a connecting lead 45. After metallic layer 44 has been deposited the end of the semiconductor is wiped clean of particles so that a hole is left in the layer 44 at each place where there was formerly a particle, as shown at 46 in Fig. 5. The layer 44, therefore, becomes somewhat like the bottom of a coarse sieve and, if the density of particles is as prescribed above, the small strips of metal between adjacent holes will be sufficiently narrow to approach line contact conditions. The layer 44 serves the function of an output electrode making a large number of line contacts with the semiconductor.

A thin layer of insulating material 47, Fig. 5, is next formed over the perforated disk 44. This may be accomplished by dipping the end of the device into a thin solution of a suitable nonporous insulating material such as shellac, lacquer or enamel. The solution should be sufficiently thin that the resulting layer of insulation has a thickness of no more than 1 to 3 microns. Again a mask may be used to limit the insulation to an area only slightly larger than disc 44. After this operation a layer of metal 48, to act as a control electrode, is formed over insulation 47. This electrode may be formed by the evaporation of silver or antimony as in the case of electrode 44. A mask may be used to limit the size of the control electrode to slightly less than that of the disc of insulation 47 and to form a connecting lead 49.

The transconductive device thus formed may be connected in suitable input and output circuits as shown in Fig. 3, the circuits being the same as for Fig. 1. The control electrode acts through the holes in the output electrode to control the electrical field in the neighborhood of the line contacts between the output electrode 44 and the semiconductor, as in the case of Fig. 1.

I claim:

1. A transconductive device comprising a semiconductor, an output electrode consisting of a thin layer of metal in contact with the surface of said semiconductor, a plurality of closely spaced perforations in said layer of metal, a thin layer of dielectric material of uniform thickness extending over and in contact with said layer of metal and those areas of the semiconductor exposed by said perforations, and an input electrode composed of a layer of metal placed over and in contact with said layer of dielectric material.

2. The process of manufacturing a transconductive device of the type employing a semiconductor as the current controlling element comprising dusting the surface of said semiconductor with a powder composed of small particles to produce a single layer of mutually spaced particles, depositing a thin layer of metal over the dusted surface of said semiconductor, removing said particles from the surface of said semiconductor so as to leave holes in the deposited layer of metal, depositing a thin layer of dielectric material of uniform thickness over said layer of metal and the areas of semiconductor exposed by said holes, and depositing a second layer of metal over said layer of dielectric material.

3. The process claimed in claim 2 in which said particles have diameters of from 1 to 3 microns and in which the ratio of particle spacing to particle diameter after the dusting process does not exceed unity.

4. The process claimed in claim 2 in which said layers of metal are deposited by condensation from a metallic vapor.

OTMAR M. STUETZER.

References Cited in the file of this patent

UNITED STATES PATENTS

| Number | Name | Date |
|---|---|---|
| 2,561,123 | Kurshan | July 17, 1951 |
| 2,595,052 | Casellini | Apr. 29, 1952 |
| 2,618,690 | Stuetzer | Nov. 18, 1952 |

FOREIGN PATENTS

| Number | Country | Date |
|---|---|---|
| 500,342 | Great Britain | Feb. 7, 1939 |